US005282303A

United States Patent [19]

Schriever

[11] Patent Number: 5,282,303

[45] Date of Patent: Feb. 1, 1994

[54] FASTENER APPLYING PRESS METHOD AND DIES THEREFOR

[75] Inventor: Frederick G. Schriever, Grosse Pointe Shores, Mich.

[73] Assignee: SnapFast Industries, Inc., Detroit, Mich.

[21] Appl. No.: 915,057

[22] Filed: Jul. 16, 1992

Related U.S. Application Data

[63] Continuation-in-part of Ser. No. 765,437, Sep. 25, 1991.

[51] Int. Cl.[5] .............. B23P 11/00

[52] U.S. Cl. .............. 29/432.1; 29/243.5; 29/243.517; 29/243.53; 29/251; 269/149; 269/165; 269/170; 81/152

[58] Field of Search .............. 29/251, 432.1, 243.53, 29/243.5, 243.517; 81/150, 152, 487; 72/409; 269/147-150, 165, 170, 6

[56] References Cited

U.S. PATENT DOCUMENTS

| | | | |
|---|---|---|---|
| 2,549,165 | 4/1951 | Brackenbury et al. . | |
| 3,145,388 | 8/1964 | Carpinella . | |
| 3,517,874 | 6/1970 | Cressy . | |
| 3,941,049 | 3/1976 | Britt . | |
| 4,296,881 | 10/1981 | Lee . | |
| 4,473,932 | 10/1984 | Widneiz | 29/251 |
| 4,506,670 | 3/1985 | Crossley . | |
| 4,874,155 | 10/1989 | Goul | 269/6 |
| 4,926,722 | 5/1990 | Sorenson et al. | 269/6 |
| 4,932,638 | 6/1990 | Chen | 269/6 |

*Primary Examiner*—Mark Rosenbaum
*Assistant Examiner*—Kenneth J. Hansen
*Attorney, Agent, or Firm*—Brooks & Kushman

[57] ABSTRACT

A hand-held press is provided for installing fasteners in a sheet of fabric. The press has a frame with a pair of arms forming a C-shaped recess into which the fabric may be inserted. The frame has a handle extending outwardly from a press axis with a lever pivotally attached to the frame adjacent the handle enabling a user to squeeze the handle and lever together. A shaft is oriented along the press axis and slidably cooperates with the frame. An advance sear on the shaft is engaged by the lever to cause the shaft to incrementally advance when the lever is squeezed with the handle. A retract sear cooperates with the shaft and the frame to prevent the shaft from retracting. A pair of die elements attached to the frame and the shaft facilitate the installation of fasteners in a sheet of fabric.

30 Claims, 4 Drawing Sheets

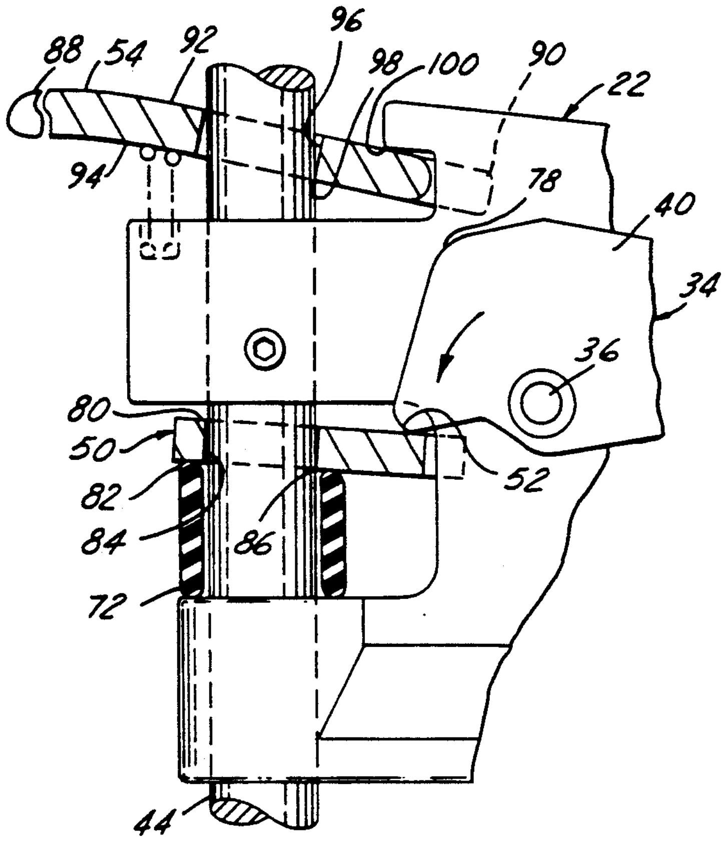
FIG.6
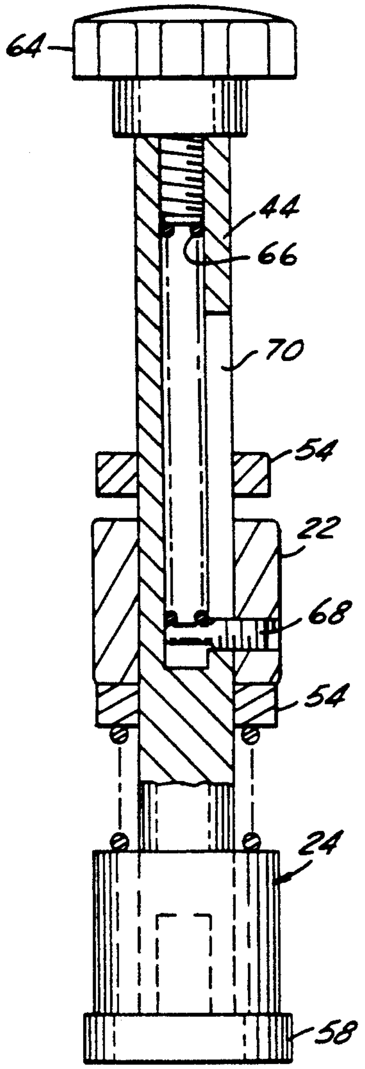
FIG.7
FIG.8
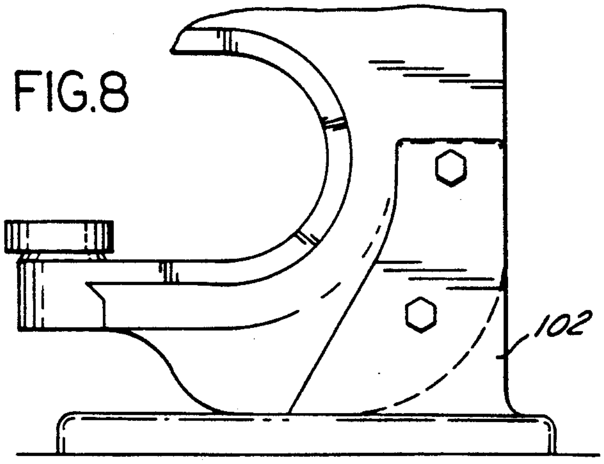
FIG.9
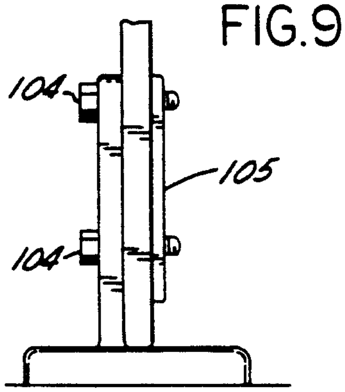

FASTENER APPLYING PRESS METHOD AND DIES THEREFOR

CROSS-REFERENCE TO RELATED APPLICATIONS

This application is a continuation-in-part of a co-pending commonly owned application entitled "Snap Fastener And Tooling Therefor", U.S. Ser. No. 07/765,437, filed Sep. 25, 1991.

TECHNICAL FIELD

This invention relates to presses for installing fasteners, more particularly, to small, lightweight, hand-held presses.

BACKGROUND ART

A variety of hand-held presses are utilized in the canvas products industry. As an example, hand-held presses are indispensable to businesses which supply boat covers and awnings. For such suppliers, on-site repairs are customary. Thus, small, lightweight, hand-held presses have been developed to enable repairs of damaged fasteners without necessitating the return of a boat cover or awning to the fabrication shop.

Existing hand-held presses typically utilize a toggle-type mechanism to advance the die members relative to one another. A disadvantage of this type of mechanism is that die travel is very limited and alignment of the dies relative to one another is made more difficult by the requisite number of joints in the mechanism.

A principal object of the invention is therefore to provide a lightweight, low cost, hand-held press which permits a relatively large amount of die travel while maintaining precise die axial alignment.

Another object of the present invention is to provide a press able to exert high axial loads on the dies throughout its range of travel and still permit easy movement of the die elements toward and apart from one another when no load is applied.

A further object of the present invention to provide a hand-held press which can be operated in essentially one hand, which thus frees the user's other hand and allows the user to brace the fabric in which the fastener is installed.

Yet another object of the present invention is to provide a hand-held press which can install thousands of fasteners without significant wear or deterioration and maintain die alignment.

Other and further objects of the invention, together with the invention's novel features will be more fully appreciated with reference to the accompanying drawings and the description of the preferred embodiment.

SUMMARY OF THE INVENTION

Accordingly, the hand-held press of the present invention is provided for installing fasteners in a sheet of fabric or other sheet material. The press includes a frame having a first and second arm which form a C-shaped recess sized to receive the fabric therebetween. A handle extends outwardly from the frame press axis enabling the frame to be grasped by a user. A lever is pivotally attached to the frame and positioned adjacent the handle enabling the user's hand to squeeze the handle and lever grip portion together. A shaft is oriented along the press axis and slidably cooperates with the frame first arm and is shiftable between an extended position when the shaft projects into the C-shaped recess toward the second arm and a withdrawn position retracted therefrom.

An advanced sear is positioned upon the shaft and cooperates with the lever to cause the shaft to incrementally advance each time the lever grip portion is squeezed toward the handle. A retract sear is mounted upon the shaft to enable the shaft to freely advance while preventing the shaft from retracting relative to the frame after each incremental advance. An attachment for first and second die element is provided on the shaft and the frame second arm in axial alignment.

Preferably, a retract spring is provided which biases the shaft to the retracted position. An advance sear spring cooperates with the advance sear and the frame to bias the advance sear opposite the direction of shaft advancement. A retract sear spring cooperates with a retract sear and the frame to elastically bias the retract sear to a normally locked position where the shaft is prevented from retracting.

BRIEF DESCRIPTION OF THE DRAWINGS

FIG. 6 is an enlarged detail drawing illustrating the cooperation between the lever, the shaft and the advance and retract sears;

FIG. 7 is a cross-sectional view taken along line 7—7 of FIG. 1;

FIGS. 8 and 9 illustrate a mounting bracket utilized to mount the hand press upon a flat support;

DETAILED DESCRIPTION OF THE PREFERRED EMBODIMENT

Figure 2:
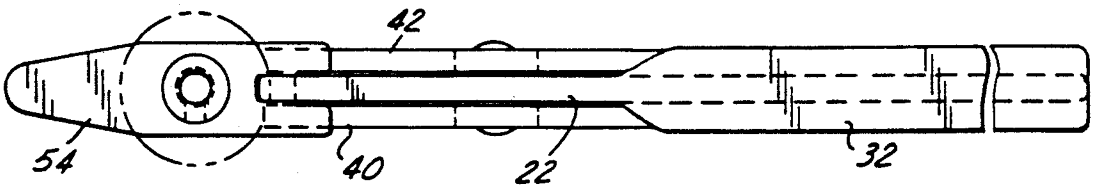
FIG. 2 is a top plan view of the press of FIG. 1.
Figure 1:
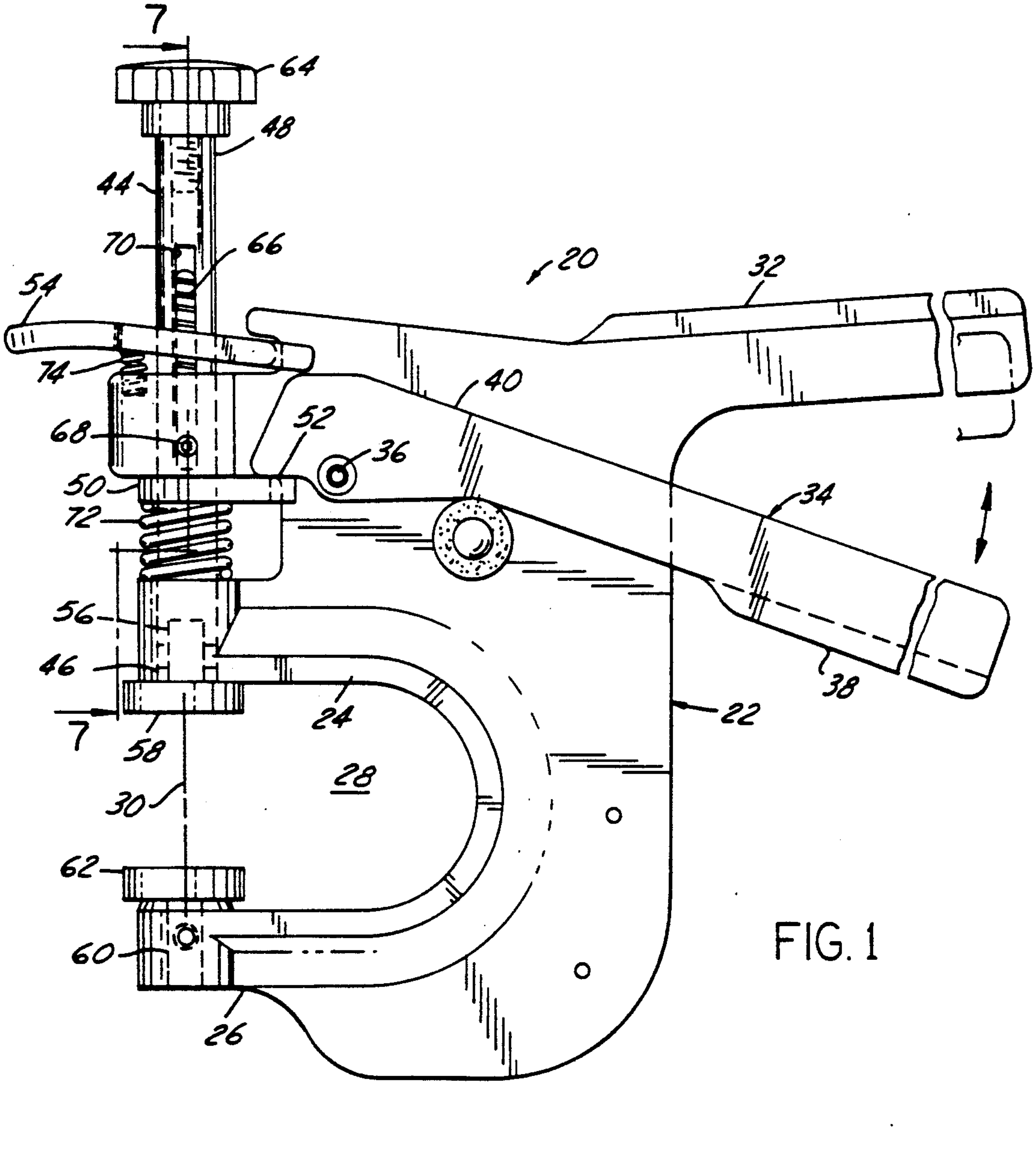
FIG. 1 is a side elevational view of a hand-held press of the present invention.

As shown generally in FIGS. 1 and 2, a hand pres 20 of the present invention is shown in side and top plan views respectively. Hand press 20 is made up of a frame 22 having first and second arms 24 and 26 which define a generally C-shaped recess 28 therebetween. Arms 24 and 26 each have end portions which intersect press axis 30 as illustrated. Extending generally radially outward from the press axis is a handle 32 which is sized to be grasped by one hand of the user of the press. Lever 34 is pivotally attached to frame 22 by pivot pin 36. Lever 34 is provided with a grip portion 38 and a fork portion which is defined by a pair of generally parallel spaced-apart fork members 40 and 42 positioned on opposite sides of frame 22.

Shaft 44 is oriented along press axis 30 and slidably cooperates with the frame first arm 24. Shaft 44 has a first end 46 which projects into the C-shaped recess toward the second arm and a second end 48 oppositely oriented therefrom. An advance sear 50 cooperates with shaft 44 and lever 34 to incrementally advance the shaft each time the lever grip portion 38 is squeezed toward handle 32 by the user.

Each of the fork members 40 and 42 are provided with a first cam surface 52 for cooperation with the advance sear. Retract sear 54 cooperates with shaft 44 and frame 22 to prevent the shaft from withdrawing after each incremental advance. The first end of the shaft is provided with a recess bore 56 which provides means for attachment of a first die element 58 to the shaft first end. Second frame arm 26 is also provided with a bore 60 which provides means for attaching a second die element 62 to the frame second arm in axial alignment with the first die element 58. Of course, Other suitable attachment means such as a threaded connection or conventional fastener could be used to facilitate the attachment of the first and second die elements to the shaft first end and to the frame second arm.

In order to facilitate the quick advance of the shaft 44, a palm button 64 is provided on the shaft second end 48, this enables a user to manually advance the shaft. Shaft 44 has a tubular region in which retract spring 66 is oriented. Pin 68 is attached to frame 22 and extends radially inwardly through a slot 70 formed in shaft 44 to engage retract spring 68. As the shaft 44 is advanced, spring 66 abuts pin 68 causing the spring to compress.

Advance sear 50 is biased in a direction opposite the direction of shaft advance by advance sear spring 72. After each incremental advance of the shaft and advance sear, the advance sear spring returns the advance sear to the position illustrated in FIG. 1 to a next lever squeeze operation.

Retract sear 54 is maintained in the normally blocked orientation shown in FIG. 1. Retract sear 54 is biased in the slot position by retract sear spring 74. As the shaft advance is steered by the user pushing directly upon palm button 64 or by squeezing lever 34, retract sear 54 initially moves slightly with the shaft for a sufficient distance to cause the retract sear to rotate relative to the shaft pivoting about its engagement with the frame so that the shaft and the retract sear become unlocked. It is during this relative movement of the retract sear and the frame that retract sear spring 74 is compressed.

Figure 3:
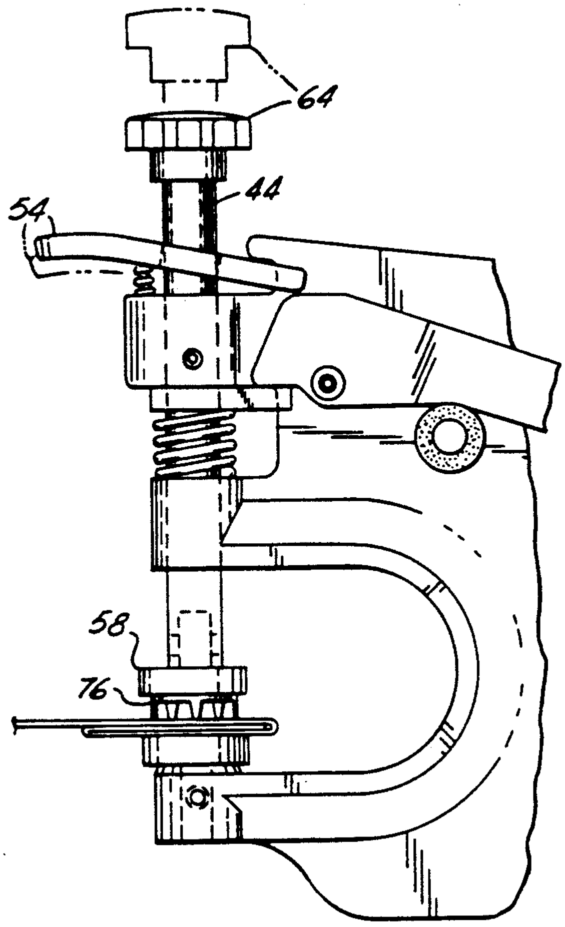
FIG. 3 is a partial side view of the press with the dies positioned adjacent a sheet of fabric prior to the commencement of the installation operation.
Figure 4:
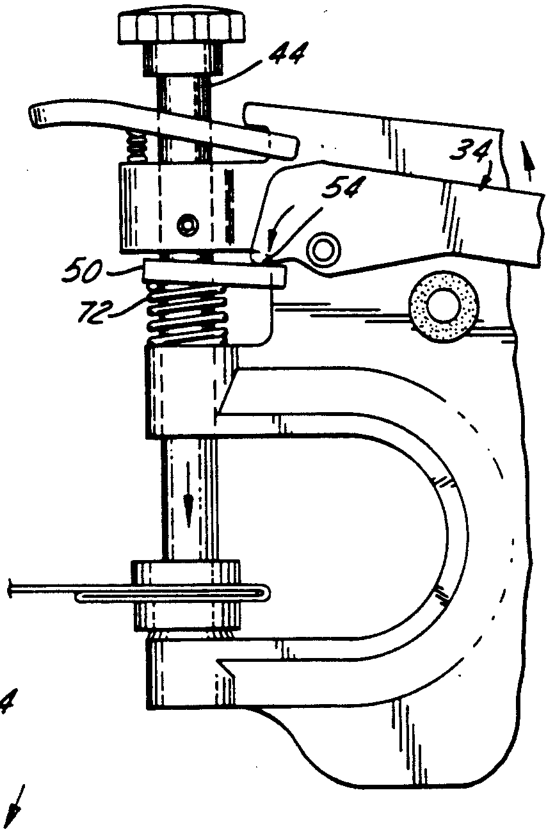
FIG. 4 illustrates the press at the completion of the crimping operation with the shaft fully advanced.

The operation of the hand press 20 can be more clearly illustrated with reference to FIGS. 3–5. A fastener 76 is installed in upper die 58 for installation within a sheet of fabric positioned within the die pair as illustrated. Fastener 76 is initially installed with the dies completely open, then the user moves the palm button on the end of shaft 44 from the fully open position illustrated in outlined form to the position illustrated where fastener 76 directly abuts the fabric. As shaft 44 is advanced, the retract sear moves between the locked position illustrated in the unlocked position shown in phantom outline.

Once the fastener 76 is positioned adjacent the fabric, the pressing operation can begin with the user squeezing the lever relative to the handle causing the first cam surface 54 on the lever 34 to force advance sear 50 in the advance direction. Initial movement of advance sear relative to shaft 44 causes the advance sear to cock slightly relative thereto and to lock thereupon. The advance sear and shaft move in the advance direction in unison. If additional travel is desired, the user may release the lever enabling the retract spring 72 to return the retract sear and lever 34 to the position shown in FIG. 3 to begin another incremental advance cycle.

Once fastener 77 is properly installed, it is necessary to open the first and second dies to facilitate removal of the fabric and installed fastener. In order to open the dies, the user can either directly release the retract sear by pushing adjacent arrow R or the user can push lever 34 away from the handle as illustrated in FIG. 5, causing second cam surface formed on the ends of lever 34 to engage the opposite end of retract sear 54 to cause a similar movement. During operation, a user's free hand is needed to stabilize the fabric, thus the use of lever 34 to release shaft 44 is particularly helpful. As previously described, retract spring 66 axially biases the shaft 44 to the retract position. Therefore, once the retract sear is released, the shaft will naturally shift to the withdrawn position illustrated in FIG. 5.

Retract sear 54 and advance sear 50 are preferably formed of a hard steel sheet having a hardness greater than that of shaft 44. Sears 50 and 54 are formed of a sheet of material having a pair of locally parallel opposed sides.

Figure 5:
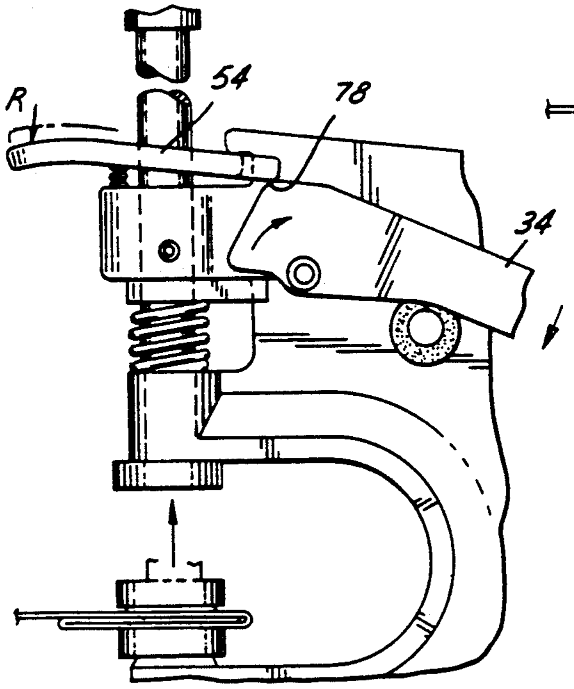
FIG. 5 illustrates the press with the shaft retracted.

As shown in FIG. 5, advance sear 50 is provided with a first side 80 which cooperates with first cam surface 52 and a second side 82 which cooperates with advance sear spring 72. A hole 84 is formed in the advance sear extending generally perpendicular to said first and second sides 80 and 84 to form a bore intersect in each of the sides to create a sharp corner. Lever first cam surface 54 engages the advance sear at a location radially spaced from the press axis thereby causing the advance sear to cock relative to the shaft, enabling the sharp corner 86 to bite into the shaft locking the advance sear and shafts together for movement in unison. When the lever is released, advance sear spring 72 causes the advance sear to rotate sufficiently to release the advance sear from the shaft enabling the advance sear and the lever to return to the orientation illustrated in FIG. 3.

Preferably, the shaft has a substantially circular cross-section having a diameter slightly less than the diameter of the bore within the advance sear. However, an oblong or oval hole also works satisfactorily.

Retract sear 54 functions quite similar to advance sear 50. The retract sear, however, as previously described, is designed to cooperate both with the lever and with the hand of the user to release the shaft. Retract sear 54 in the preferred embodiment is elongated having first and second ends 88 and 90. Retract sear 54, like advance sear 50, is formed of a hard steel sheet having a pair of locally parallel opposed sides 92 and 94. A hole 96 extends perpendicularly to first and second sides 92 and 94 forming a bore intersecting each of the sides to create a sharp corner 98 as illustrated. Sharp corner 98 bites into the shaft when the retract sear is in the aligned position illustrated in FIG. 6 permitting the shaft from withdrawing. A hole 96 is formed in the retract sear 54 intermediate first and second ends 88 and 90.

Retract sear 54 has an engagement portion 100 located between hole 96 and second end 90 for abutting frame 22. As previously described, the retract sear pivots relative to the frame causing the orientation between the retract sear and the shaft to vary between the locked and the unlocked position. A second end 90 of retract sear 54 is forked to enable the retract sear to extend on opposite sides of the frame to contact second cam surfaces 78 on fork members 40 and 42.

In FIG. 6, retract spring 72 is shown as a tubular elastic member. In FIGS. 1 and 3–5, spring 72 is illustrated as a coil spring. Either spring design work quite satisfactorily. The coil spring design can achieve higher spring loads with a given space, while the elastomeric tubular spring design can achieve a very smooth exterior surface which is easy to keep clean.

FIG. 7 is a cross-sectional side elevation of the hand press 20 taken along line 7—7 in FIG. 1. The tubular bore within shaft 44 as illustrated and the orientation of spring 66 and slot 77 relative thereto. As illustrated, one end of spring 66 abuts pin 68 which is affixed to frame 22 and projects radially inward through slot 70 and into the interior region of the shaft tubular section to provide a stop for one end of retract spring 66. As illustrated, palm button 64 also serves to retain the opposite end of advance spring 66.

A mounting bracket 102 illustrated in FIGS. 8 and 9 can alternatively be attached to hand press 22 in order to facilitate the placement of the hand press on a flat surface. This mounting bracket can be removably attached to the hand press using conventional fastener bolts 104 and a retainer plate 105 having a pair of threaded holes formed therein. Fastener 104 is 10 particularly helpful when installing fasteners in the marginal edge of the fabric when working on a flat table surface. The hand press can be left in a generally vertical upright position while the user has two hands free to position the fabric.

FIGS. 10–14 illustrate a first and second die pair designed for use with the hand press of present invention to install a novel fastener which is the subject of a co-pending, commonly owned patent application entitled "Snap Fastener And Tooling Therefor", U.S. Ser. No. 07/765,437, filed Sep. 25, 1991, which is incorporated by reference herein, in order to provide additional background info regarding the structure of the fastener illustrated. The first die 58 illustrated is substantially identical to that shown in the referenced application.

Figure 11:
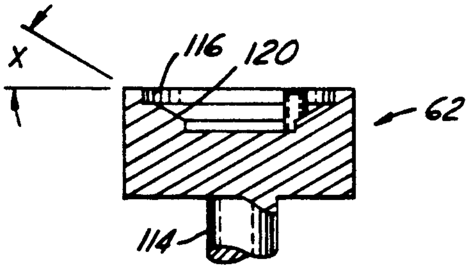
FIG. 11 is a cross-sectional side elevation taken along the line 11—11 of FIG. 10.
Figure 10:
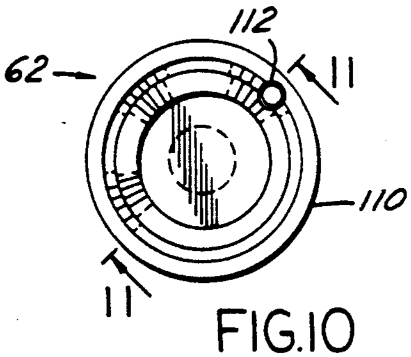
FIG. 10 is a top plan view of a lower die assembly.
Figure 12:
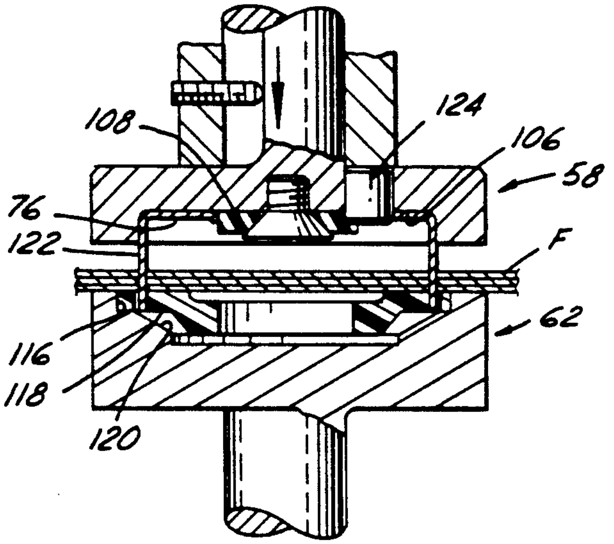
FIG. 12 is a cross-sectional side elevation of an upper and lower die assembly at the commencement of the crimping operation.

The first die element includes pocket 106 and elastic member 108 providing means for temporarily retaining a prong cap provided with a plurality of prongs circumferentially spaced thereabout with the prongs parallel to the die axis as shown in FIG. 12. The second die 62 is substantially different. The second die 62 is shown in plan view in FIG. 10. The second die is made up of a body portion 110, an alignment pin 112 and a shank portion 114 to facilitate the attachment of the second die element to the press second arm 26. As illustrated in the FIG. 11 cross-section, first die element has a cylindrical pocket 116 formed therein into which annular plastic receiver 118 fits. Pocket 116 provides means for temporarily retaining receiver 118 in coaxial alignment with the prong cap during installation.

A frusto conical inwardly converging section 20 is formed in second die 62 adjacent pocket 116 in order to crimp prongs 122 of fastener 76 retained in first die element 58. The frusto conical section preferably has walls which are inclined relative to a plane perpendicular to the press axis by an angle X as illustrated in FIG. 11 where X also is in the range of 15°–20°, and most preferably, approximately 17°. Frusto conical section 120 forms a die face which is fixed relative to the retainer during installation and is much cheaper and simpler than the 2-stage die of the reference application.

Figure 13:
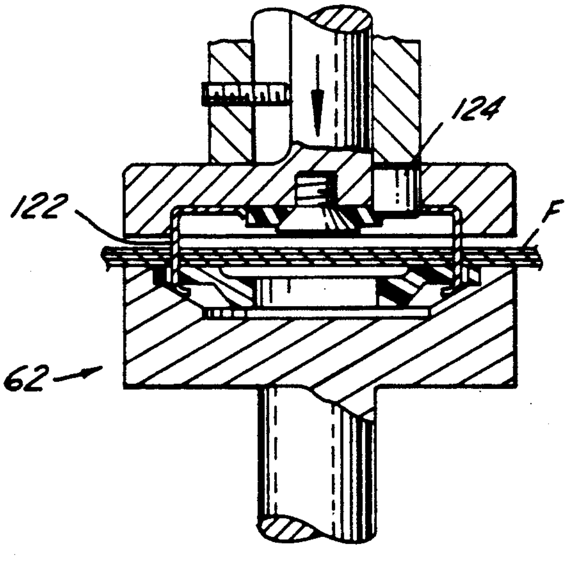
FIG. 13 shows the upper and lower die assembly with the crimp partially completed.
Figure 14:
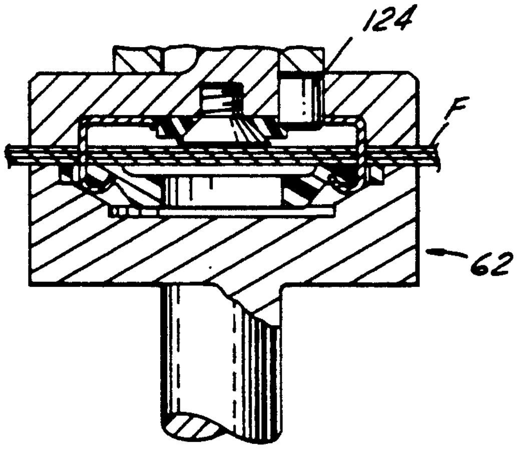
FIG. 14 shows the upper and lower die assembly with the crimp fully formed.

FIGS. 12–14 are a series of sequential cross-sectional views illustrating the crimping of prongs 122 through and around receiver 118. Receiver 118 and the prong fastener 76 are angularly oriented relative to one another in proper alignment by pins 124 and 112 in the first and second die elements, respectively.

In FIG. 12, the prongs 122 are shown penetrating through fabric F and extending through slots formed in receiver 118 and abutting frusto conical surface 120. Continued advancement of the first and second die elements causes the ends of prongs 122 to curl inwardly as illustrated in FIG. 13. Further relative motion of the first and second dies as illustrated in FIG. 14 causes the ends of prongs 122 to fully curl inwardly toward the die axis causing the free ends to penetrate and become buried within the plastic material forming retainer 118.

The single stage die design illustrated forms a very strong and secure joint that is quite resistant to pull out. By burying the free ends of prongs 122 within the plastic body of retainer 118, the possibility of scratching a surface to which the fastener is to be attached can be greatly minimized.

While the best mode for carrying out the invention has been described in detail, those familiar with the art to which this invention relates will recognize various alternative designs and embodiments for practicing the invention as defined by the following claims.

What is claimed is:

1. A hand held press for installing fasteners in a sheet of fabric said press comprising:
- a rigid frame having first and second arms forming a C-shaped recess, said arms having fixed spaced apart ends which intersect a press axis;
- a handle extending from the frame;
- a lever pivotally attached to the frame and having a grip portion positioned adjacent the handle enabling a user's hand to squeeze the handle and lever grip portion together;
- a shaft oriented along said press axis and having first and second ends, said shaft slidably cooperating with the frame first arm and shiftable between an extended position wherein the shaft first end projects into the C-shaped recess toward the second arm and withdrawn position retracted therefrom;
- an advance sear cooperating with the shaft and the lever to cause the shaft to incrementally advance each time the lever grip portion is squeezed toward the handle;
- a retract sear cooperating with the shaft and the frame to enable the shaft to freely advance while preventing the shaft from retracting after each incremental advance;
- means for attaching a first die element to the shaft first end in axial alignment therewith; and
- means for attaching a second die element to the frame second arm in axial alignment with a first die element and the shaft.

2. The press of claim 1 wherein the handle extends outwardly from the press axis generally parallel with the frame first and second arms.

3. The press of claim 1 wherein the shaft is sufficiently long so that the shaft second end, when the shaft is fully extended into the C-shaped recess the shaft second end, projects outward from the frame thereby enabling the user to manually advance the shaft from the withdrawn position to the extended position by pushing the shaft second end toward to the frame.

4. The press of claim 1 further comprising, means for preventing the shaft from rotating about the shaft axis relative to the frame.

5. The press of claim 1 further comprising a retract spring cooperating with the frame and the shaft to elastically bias the shaft to the retracted position.

6. The press of claim 1 wherein the lever and the retract sear are located sufficiently close to one another so that when the lever is pivoted in a direction away from the handle the lever engages the retract sear to shift the same causing the shaft to be released enabling the retract spring to move the shaft to the withdrawn position.

7. A hand held press for installing fasteners in a sheet of fabric, said press comprising:
- a rigid frame having first and second arms forming a C-shaped recess, said arms having fixed spaced apart ends which intersects a press axis;
- a handle extending from the frame;
- a lever pivotally attached to the frame and having a grip portion positioned adjacent the handle enabling a user's hand to squeeze the handle and lever grip portion together;
- a shaft oriented along said press axis and having first and second ends, said shaft slidably cooperating with the frame first arm and shiftable between an extended position wherein the shaft first end projects into the C-shaped recess toward the second arm and a withdrawn position retracted therefrom;
- an advance sear cooperating with the shaft and the lever to cause the shaft to incrementally advance each time the lever grip portion is squeezed toward the handle;
- a retract sear cooperating with the shaft and the frame to enable the shaft to freely advance while preventing the shaft from retracting after each incremental advance;
- a retract sear spring cooperating with the frame and the shaft to elastically bias the shaft to the retract position, wherein said shaft is provided with a hollow tubular region sized to receive the retract spring therein;
- means for attaching a first die element to the shaft first end in axial alignment therewith; and
- means for attaching a second die element to the frame second arm in axial alignment with a first die element and the shaft.

8. The press of claim 7 wherein the shaft is provided with an axially extending radial slot projecting into the shaft hollow tubular region.

9. The press of claim 8 further comprising a shaft guide affixed to the frame and extending into the shaft slot to prevent rotation of the shaft about the shaft axis.

10. The press of claim 8 wherein said shaft guide extends into said hollow region and the retract spring bears at one end against said shaft guide and at the opposite end against an end of said hollow region.

11. A hand held press for installing fasteners in a sheet of fabric, said press comprising:
- a rigid frame having first and second arms forming a C-shaped recess, said arms having fixed spaced apart ends which intersect a press axis;
- a handle cooperating with the frame and extending radially outward from the press axis;
- a lever pivotally attached to the frame and having a grip portion positioned adjacent the handle enabling a user's hand to squeeze the handle and lever grip portion together;
- a shaft oriented along said press axis and having first and second ends, said shaft slidably cooperating with the frame first arm and shiftable between an extended position wherein the shaft first end projects into the C-shaped recess toward the second arm and a withdrawn position retracted therefrom;
- a retract sear cooperating with the frame and the shaft to elastically bias the shaft to the retracted position;
- an advance sear cooperating with the shaft and the lever to cause the shaft to incremental advance each time the lever grip is pivoted toward the handle;
- a retract sear cooperating with the shaft and the frame to enable the shaft to freely advance while preventing the shaft from retracting after each incremental advance; and
- a retract sear spring cooperating with the retract sear and the frame to elastically bias the retract sear to a normally locked position wherein the shaft is prevented from retracting.

12. The press of claim 11 wherein the frame and the handle are integrally formed as a unitary metal casting.

13. The press of claim 11 further comprising a first die element affixed to the shaft first end and a axially aligned second die element affixed to the frame second arm.

14. The press of claim 11 wherein the lever and the retract sear are located sufficiently close to one another so the when the lever is pivoted in a direction away from the handle the lever engages the retract sear causing the shaft to be released enabling the retract spring to move the shaft to the withdrawn position.

15. The press of claim 11 wherein the shaft is sufficiently long so that the shaft second end projects from the frame a distance sufficient to enable the user to manually advance the shaft to the extended position by pushing the shaft second end relative to the frame.

16. The press of claim 15 further comprising a palm button affixed to the shaft second end for cooperation with to hand of the user.

17. The press of claim 11 wherein the lever is provided with a fork portion forming an end opposite the handle portion, said fork portion defined by a pair of generally parallel spaced apart fork members positioned on opposite sides of and pivotally attached to the frame.

18. The press of claim 17 wherein the fork members are each provided with a first cam surface for cooperation with the advance sear.

19. The press of claim 18 wherein the fork members are each provided with a second cam surface for cooperation with the retract sear.

20. The press of claim 11 further comprising means for preventing the shaft from rotating about the press axis relative to the frame.

21. The press of claim 11 wherein the retract and advance sears each have a hole formed therein sized to loosely fit on the shaft when oriented in an aligned position and to bind on the shaft when oriented acutely relative to the aligned position.

22. The press of claim 21 wherein the shaft has a circular cross section.

23. The press of claim 22 wherein the regions of the shaft cooperating with the advance and retract sears have substantially smooth cylindrical surfaces.

24. The press of claim 23 wherein the advance and retract sears are formed of a material which is harder than the shaft.

25. The press of claim 11 wherein the retract spring comprises a tubular elastomeric member formed of a rubber-like material.

26. A hand held press for installing fasteners in a sheet of fabric, said press comprising:

a rigid frame having first and second arms forming a C-shaped recess, said arms having fixed spaced apart ends which intersects a press axis;

a handle cooperating with the frame and extending radially outward from the press axis;

a lever pivotally attached to the frame and having a grip portion positioned adjacent the handle enabling a user's hand to squeeze the handle and lever grip portion together;

a shaft having a circular cross-section oriented along said press axis and having first and second ends, said shaft slidably cooperating with the frame first arm and shiftable between an extended position wherein the shaft first end projects into the C-shaped recess toward the second arm and a withdrawn position retracted therefrom;

a retract spring cooperating with the frame and the shaft to elastically bias the shaft to the retracted position;

an advance sear cooperating with the shaft and the lever to cause the shaft to incremental advance each time the lever grip is pivoted toward the handle;

a retract sear cooperating with the shaft and the frame to enable the shaft to freely advance while preventing the shaft from retracting after each incremental advance; and a retract sear spring cooperating with the retract sear and the frame to elastically bias the retract sear to a normally locked position wherein the shaft is prevented from retracting;

wherein the advance and retract sears are each formed of a hard steel sheet having a pair of locally parallel opposed sides with said hole formed therein extending generally perpendicularly to said sides forming a bore intersecting each of the sides to create a sharp corner.

27. The press of claim 26 wherein the retract sear is elongated and first and second end with said hole formed therebetween, said retract sear having an engagement region located between the hole and the second end which abuts the frame limiting movement along the press axis in either direction while permitting the retract sear to pivot relative to the frame.

28. The press of claim 27 wherein the lower and the retract sear are located sufficiently close to one another so the when the lever is pivoted in a direction away from the handle the lever engages the retract sear second end pivoting the retract sear relative to the frame causing the shaft to be released enabling the retract spring to move the shaft to the withdrawn position.

29. The press of claim 26 wherein the retract sear has sufficient length between the first end and the hole to provide a surface for cooperating with the retract spring sear on one side thereof and a surface on the opposite side to enable the user to manually pivot the retract sear.

30. A method of installing a two-piece fastener in a fabric substrate, the method comprising:

providing a first and second die element for cooperating with the two-piece fastener to be installed in the fabric;

installing first and second die elements in a press having a rigid C-shaped frame and a shaft positionable relative thereto along a press axis, wherein one of said die elements is affixed axially to the shaft and the other is affixed to the frame in opposed relation along the press axis;

installing a pair of fastener components in the first and second die elements;

positioning a fabric substrate within the C-shaped press between the die elements;

manually advancing the shaft by pushing on the end of the shaft opposite the die element until the fastener components abut on opposite sides of the fabric;

preventing the shaft from axially withdrawing utilizing a retract sear cooperating with the shaft and the frame;

manipulating a lever pivotally attached to the frame wherein one end of the lever cooperates with the hand of a user and the opposite end cooperates with an advance sear positioned about the shaft to cause the shaft to incrementally advance squeezing the first and second die elements together to secure the fastener components on the fabric; and releasing the shaft by manipulating the retract sear, enabling the fabric and the installed fastener to be removed.

* * * * *

UNITED STATES PATENT AND TRADEMARK OFFICE
CERTIFICATE OF CORRECTION

PATENT NO. : 5,282,303

DATED : February 1, 1994

INVENTOR(S) : Frederick G. Schriever

It is certified that error appears in the above-identified patent and that said Letters Patent is hereby corrected as shown below:

Col. 2, line 51, after "a hand" delete "pres" and insert --press--

Col. 5, line 24, after "104 is" delete "10".

Col. 5, line 31, after "press of" insert --the--.

Col. 5, line 55, after "section" delete "20" and insert --120--.

Col. 7, line 6, claim 6, delete "the" and insert --that--.

Col. 8, line 24, claim 13, after "end and" delete "a" and insert --an--.

Col. 8, line 29, claim 14, after "so" delete "the" and insert --that--.

Col. 8, line 40, claim 16, after "with" delete "to" and insert --the--.

Col. 9, lines 44 and 45, claim 27, after "is elongated and" insert --has--.

Col. 10, line 3, claim 28 after "wherein the" delete "lower" and insert --lever--.

Col. 10, line 5, claim 28, after "so" delete "the" and insert --that--.

Signed and Sealed this

Sixth Day of September, 1994

Attest:

BRUCE LEHMAN

*Attesting Officer*

*Commissioner of Patents and Trademarks*